United States Patent [19]

Nupnau

[11] 3,791,622
[45] Feb. 12, 1974

[54] INDEXING MECHANISM
[75] Inventor: Arthur E. Nupnau, Chicago, Ill.
[73] Assignee: Bell & Howell, Chicago, Ill.
[22] Filed: Jan. 26, 1972
[21] Appl. No.: 220,954

[52] U.S. Cl. .............................. 352/123, 274/4 F
[51] Int. Cl. ........................................ G03b 21/04
[58] Field of Search ................ 274/4 F; 352/8, 123

[56] References Cited
UNITED STATES PATENTS
3,561,853  2/1971  Thevenaz ........................... 352/123
3,188,091  6/1965  Goodell ........................... 274/4 F X
3,512,786  5/1970  Ban .................................. 274/4 F Primary Examiner—Monroe H. Hayes

[57] ABSTRACT

An indexing mechanism for sequentially presenting each of a plurality of cassettes containing photographic film to a projection station in a film projector. The indexing mechanism includes a pair of stop members that are alternately placed in and out of engagement with an abutment on the cassette.

3 Claims, 5 Drawing Figures

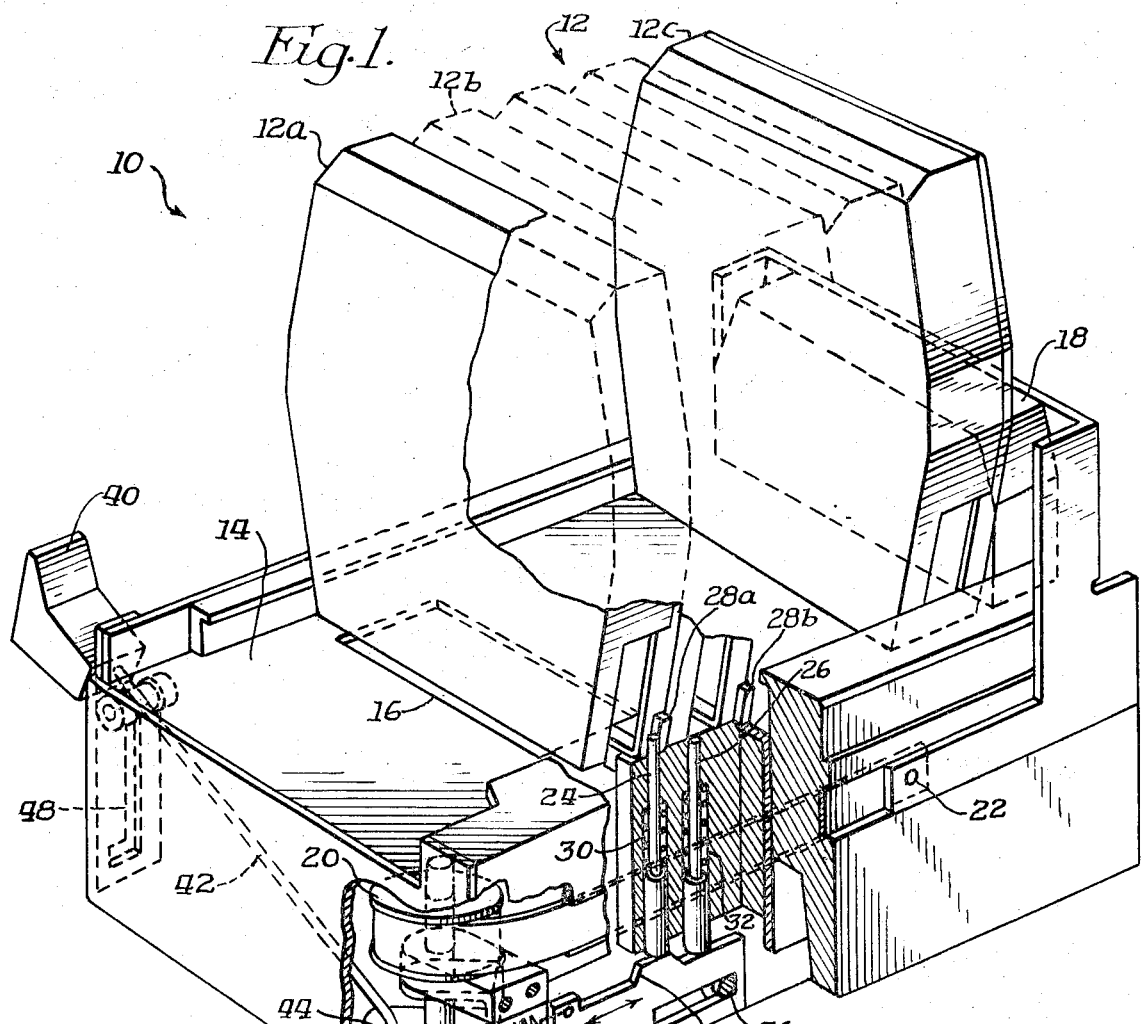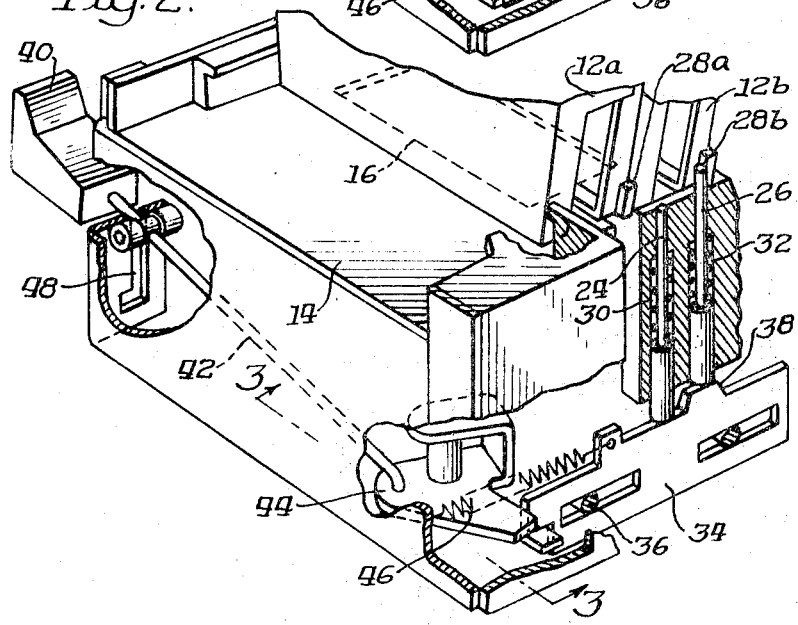

PATENTED FEB 12 1974 3,791,622

INDEXING MECHANISM

BACKGROUND OF THE INVENTION

This invention relates to film projectors and in particular to an indexing mechanism for a movie projector capable of handling film stored in a plurality of cassettes.

Movie projectors have been developed which project film contained in a cassette. Some of these projectors are designed to accept a plurality of cassettes, usually stacked in side by side relation, and to sequentially project the film contained in each cassette. These projectors require an indexing mechanism to cycle the cassettes into and out of the projection station.

Some prior projectors have included a tray into which the cassettes are placed and an indexing mechanism which indexes the tray. Because of the presence of the tray a great number of parts have been required and in general the prior indexing mechanisms have been quite complex.

SUMMARY OF THE INVENTION

To overcome the difficulties present in the prior art this invention presents the indexing mechanism which does not require a tray. The cassettes themselves move in a supply well rather than moving with a tray. Furthermore, a simplified indexing mechanism is presented which includes a pair of stop members that alternately engage an abutment formed on each cassette. A manually operable mechanism is included to properly activate the stop members. Moreover, means are provided to simultaneously remove the stop members from the well to facilitate loading of the projector.

BRIEF DESCRIPTION OF THE DRAWINGS

The features of this invention will become more apparent in the following description of the preferred embodiment read in conjunction with the figures in which:

FIG. 1 is a perspective view, partially cut away, of an indexing mechanism for use in a projector.

FIGS. 2, 4 and 5 are perspective views of a portion of FIG. 1 with the indexing mechanism in different operational positions.

FIG. 3 is an end view of a portion of FIG. 1.

DETAILED DESCRIPTION OF THE PREFERRED EMBODIMENT

Figure 4:
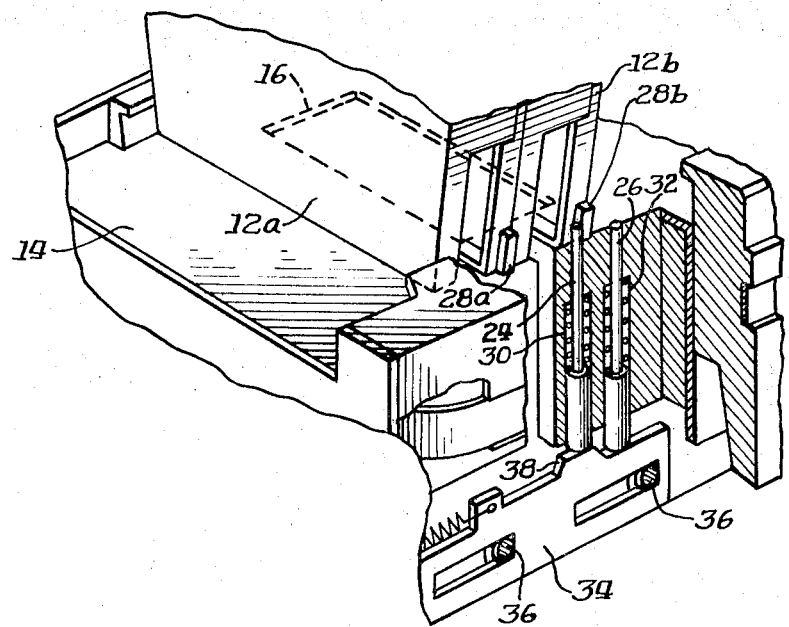

Referring now to the drawings in which like numerals indicate like parts, FIG. 1 depicts a supply station 10 of a movie projector (not shown). The movie projector, of course, would contain all the necessary elements to project movie film. However, it has not been illustrated because it is not necessary to an understanding of this invention.

A supply of five cassettes 12 are disposed in a well 14 in the supply station 10. Each cassette would contain a reel of movie film (not shown). An aperture 16 is formed in the well 14. As the aperture 16 would include the necessary mechanisms for extracting the film from the cassettes 12 for projection in the movie projector it will be referred to as the projection station.

A pusher 18 urges the cassettes 12 toward the projection station 16 through the action of a negator spring 20. The negator spring 20 is coupled with the pusher 18 by a suitable fastener 22. The pusher 18 acts on the last cassette 12c in the supply 12 and pushes the entire supply 12 towards the projection station 16.

The action of the pusher 18 is opposed by a front stop 24 and a backstop 26. The stops 24, 26 are rods disposed in a vertical chamber and may protrude into the well 14 to engage abutments 28a, 28b formed on each of the cassettes 12. As depicted in FIG. 1 the front stop 24 engages the abutment 28a on the leading cassette 12a to position the film supply at the projection station 16. In this position the film in cassette 12a could be projected.

The stops 24, 26 are biased out of the well 14 by a pair of compression springs 30, 32. The stops 24, 26 are limited in their downward movement by the upper edge of a sliding plate 34 which is mounted for right to left reciprocal motion on a pair of pins 36.

A cam surface 38 is formed on the top of the plate 34 and when it underlies one of the stops 24, 26 it raises the stop into an interfering relationship with the travel path of the abutments 28a, 28b. As shown in FIG. 1 the cam 38 underlies the stop 24 and has forced it into interfering relationship with the abutment 28a.

To slide the plate 34 a manually operable lever 40 is connected to a rod 42 which is coupled to a rotatable member 44. By depressing the lever 40 the rotatable member 44 acts on the plate 34 and shifts it rightwardly (FIG. 2) in opposition to a retaining spring 46. Releasing the lever 40 allows the plate 34 to return to the position shown in FIG. 1 because of the action of the spring 46.

INDEXING OPERATION

FIG. 1 depicts the indexing apparatus after a new supply of cassettes 12 has been placed in the well 14. The front stop 24 engages abutment 28a and cassette 12a is positioned for projection. After the film in cassette 12a has been projected and rewound it is necessary to index the supply leftwardly and position cassette 12b at the projection station 16.

To effect that cycle the operator depresses the lever 40 to the position shown in FIG. 2. This causes the plate 34 to slide rightwardly. The action of the cam 38 causes the front stop 24 to be lowered and the back stop 26 to be raised. When the front stop 24 no longer engages abutment 28a the pusher 18 can move the supply 12 leftwardly until the back stop 26 engages abutment 28b as shown in FIG. 2. At this point cassette 12b has not yet arrived at the projection station 16.

The cycle is completed by releasing the lever 40 to allow the plate 34 to return to the position shown in FIG. 1. As the plate 34 moves leftwardly the back stop 26 is lowered and the front stop 24 is raised. When the back stop 26 no longer engages abutment 28b the supply 12 will move leftwardly under the influence of the pusher 18. This motion will continue until stop 24 engages abutment 28b whereby cassette 12b will be positioned at the projection station 16 as shown in FIG. 4.

This cycle may then be repeated until the supply is exhausted. Moreover, it is apparent that any given cassette or cassettes need not be projected as they can be bypassed by simply depressing and releasing the lever 40.

It should be clear that for indexing the spacing of the stops 24, 26 and the configuration of the cam 38 must be such that one of the stops is always in the well 14 to interfere with the travel path of the next abutment. If that were not the case the supply 12 would simply be pushed out of the well 14.

LOADING AND REMOVING THE SUPPLY

Figure 5:
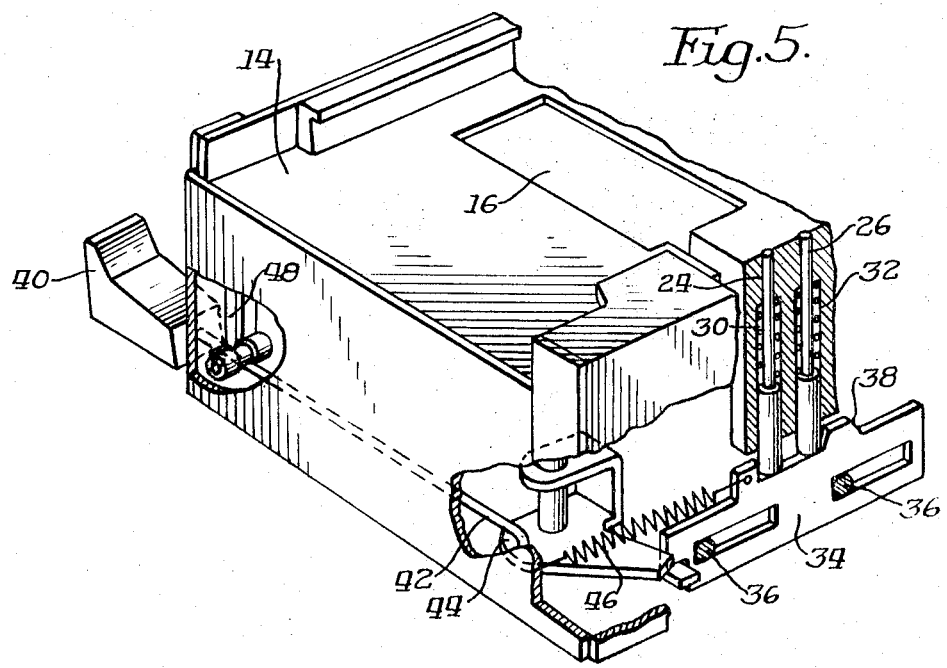

When the supply 12 is inserted into the well 14 and when it is to be removed without indexing the entire supply it is desirable to remove both stops 24, 26 from the well 14. To accomplish this the lever 40 is depressed to the bottom of the guide slot 48 as shown in FIG. 5. The cam 38 is moved to its limit of rightward movement and does not support the stops 24, 26. The stops 24, 26 are both out of the well 14 and the supply 12 may be rapidly inserted in or removed from the well 14.

As depicted herein the stops are spring-biased out of the well 14. It is apparent however that they could be spring-biased into the well and with an appropriate modification the plate 34 could force them out of the well with the same type of cycle illustrated herein. Moreover, the cassettes have abutments formed on just one edge and it is also apparent that abutments could be provided on both edges, the indexing mechanism duplicated on the other side.

Thus a new and improved indexing mechanism has been described. It does not require the use of complex mechanisms and the cassettes travel along their own surfaces without the need for a movable tray.

What is claimed is:

1. An indexing mechanism in a film projector comprising: well means for receiving a plurality of cassettes stacked in side-by-side relation, each of said cassettes including an abutment means;

means associated with said well means for urging said stack of cassettes along a travel path toward a projection station in said projector;

stop means including a front stop rod and a back stop rod mounted in parallel with one another for reciprocating movement orthogonally into and out of the travel path of said stack of cassettes for engaging the abutment means on the cassettes, said back rod positioning a leading cassette at said projection station and said front rod positioning a trailing cassette adjacent and prior to said projection station; and camming means for alternately reciprocating said front and back stop rods, said camming means having an elevated surface for moving said front and back stop rods into the travel path of said cassettes, a first lowered surface for moving said front stop rod out of the travel path of said cassettes and a second lowered surface for moving said back stop rod out of the travel path of said cassettes, said camming means placing said back stop rod into the travel path of said cassettes while placing said front stop rod out of the travel path of said cassettes, and placing said back stop rod out of the travel path while placing the front stop rod into the travel path of said cassettes.

2. The indexing mechanism of claim 1 wherein said front stop rod and said back stop rod are biased against said camming means.

3. The indexing mechanism of claim 1 wherein said camming means includes a third lowered surface cooperating with one of said first and second lowered surfaces to move both said front stop rod and said back stop rod out of the travel path of said cassettes to permit movement of said cassettes along the travel path thereof.

* * * * *